(12) United States Patent
Pointeau et al.

(10) Patent No.: US 6,892,180 B1
(45) Date of Patent: May 10, 2005

(54) DEVICE, METHOD AND COMPUTERIZED CASHING SYSTEM FOR AUTOMATIC DELIVERY OF DISCOUNT COUPONS

(75) Inventors: Marcel Pointeau, Toulouse (FR); Denis Dargelos, Cugnaux (FR); Jean-Claude Cazalbou, Toulouse (FR); Jean-François Barteau, Saint Etienne de Montluc (FR)

(73) Assignee: INFOMIL, Toulouse (FR)

( * ) Notice: Subject to any disclaimer, the term of this patent is extended or adjusted under 35 U.S.C. 154(b) by 585 days.

(21) Appl. No.: 09/446,516

(22) PCT Filed: Jul. 7, 1998

(86) PCT No.: PCT/FR98/01456

§ 371 (c)(1),
(2), (4) Date: Dec. 28, 1999

(87) PCT Pub. No.: WO99/03051

PCT Pub. Date: Jan. 21, 1999

(30) Foreign Application Priority Data

Jul. 9, 1997 (FR) .............................................. 97 08712

(51) Int. Cl.⁷ ............................................... G06F 17/60
(52) U.S. Cl. ........................................................ 705/14
(58) Field of Search ........................................... 705/14

(56) References Cited

U.S. PATENT DOCUMENTS

| | | | |
|---|---|---|---|
| 5,353,218 A | 10/1994 | De Lapa et al. ............. | 364/401 |
| 5,368,129 A | * 11/1994 | Von Kohorn ................. | 186/52 |
| 5,537,314 A | 7/1996 | Kanter ......................... | 364/406 |
| 5,638,457 A | * 6/1997 | Deaton et al. .............. | 382/100 |

FOREIGN PATENT DOCUMENTS

| | | |
|---|---|---|
| EP | 0 512 509 | 11/1992 |
| EP | 0 567 291 | 10/1993 |
| GB | 2 163 581 | 2/1986 |
| GB | 2 278 479 | 11/1994 |
| GB | 2 306 740 | 5/1997 |
| WO | WO 88/05578 | 7/1988 |
| WO | WO 92/14213 | 8/1992 |
| WO | WO 96/32683 | 10/1996 |
| WO | WO 97/20279 | 6/1997 |

* cited by examiner

*Primary Examiner*—Donald L. Champagne
(74) *Attorney, Agent, or Firm*—Young & Thompson

(57) ABSTRACT

A method and device for automatically delivering gift/discount coupons when customers call a store cash desk for registration or payment of purchases. The device includes at least one control server, and at least one cash desk. The method consists in comparing the purchase and/or the customer's identity to the allocation conditions recorded in at least one CRITERIA file and in composing and delivering the coupons according to a type defined in a COUPON TYPE file.

35 Claims, 3 Drawing Sheets

DEVICE, METHOD AND COMPUTERIZED CASHING SYSTEM FOR AUTOMATIC DELIVERY OF DISCOUNT COUPONS

BACKGROUND OF THE INVENTION

The invention relates to a device and a method for automatic issuing of commercial advantage coupons, when clients go to the check-out(s) of a store, in order to record and pay for articles purchased. The invention also relates to a store computerised cashing system, which is provided with a device of this type.

EP-A-O 512 509 describes a device which makes it possible to print discount vouchers automatically at store check-out(s), in accordance with conditions fulfilled by the clients. In order to function, this device requires:

- installation in each store of a specific network of printers connected to a specific computer, which itself is connected to the check-out terminal network, this computer including a file of purchases by clients, and a data base, in which the terms of the discount vouchers are stored;
- connection of the specific computer to a remote host computer with a centralised data base containing the various files of each store; and
- entry in the file of articles of each store, of a field which is actuated on an additional bit.

This device is thus complex and costly. Its installation is lengthy, and pre-supposes modifications not only of the hardware and software, but also of all the data for the store.

In addition, this device, which is controlled and updated by a remote host computer, makes the store lose control of functioning, and therefore cannot be envisaged for stores which are entirely autonomous from the point of view of management (and are not dependent on a chain of stores). In particular, it does not allow the store to allocate commercial advantages which are specific to it, or to modify at any time the conditions of allocation of these commercial advantages.

Furthermore, this device makes it possible to issue only discount vouchers according to pre-selected conditions relating to the client and/or according to the presence of pre-determined actuating products, amongst the articles purchased by the client. Its applications are thus limited, and in particular it does not make it possible:

- to issue and control commercial advantage coupons other than discount vouchers (purchasing vouchers which are valid for all or part of the store, loyalty points, gift allocation vouchers, commercial messages etc.);
- to issue commercial advantage coupons according to criteria of allocation other than the presence of an article amongst the purchase, or of the data of clients who hold credit cards issued by the store; or
- for the store itself to define at any time the conditions of allocation and/or the value and/or the description and/or the conditions of validity and refund of the commercial advantage coupons.

SUMMARY OF THE INVENTION

The object of invention is to eliminate these disadvantages by proposing a device and a method which are more effective than the previous systems, which can be controlled and updated entirely by the store itself, and are simple and economical to install and use, in particular without requiring additional devices or new acquisition or complete modification of the data for the store.

The object of the invention is also to propose a device and a method for automatic issuing of commercial advantage coupons, which at the same time have increased performance in terms of the characteristics of the various coupons issued, their conditions of allocation, and the configurations and options available to the stores, and can be integrated simply and economically in most computerised store cashing systems.

Throughout the present text, the following terminology is adopted:

commercial advantage: any advantage such as a voucher for subsequent use, in particular a purchasing voucher, loyalty point, voucher for allocation of gifts, voucher giving the right to take part in a game or lottery, or even a commercial information message etc., which can be allocated to a client of a store, and which makes it possible to influence the future commercial behaviour of this client;

coupon, or commercial advantage coupon: any support which can be issued to a client and then taken away by the client, by means of which the client can be informed of the characteristics of a corresponding commercial advantage which is allocated to him;

commercial advantage value: any numerical value incorporated in a commercial advantage, and which represents this commercial advantage at least partially quantitatively (amount of the voucher in monetary units, as a percentage of a purchase amount, a quantity of products allocated, number of points etc.); it should be noted that the invention also applies to issuing of commercial advantage coupons without value (for example advertising messages);

automatic issuing of coupons: providing coupons without the need for intervention or action by the store employees, in particular the cashier; on the other hand intervention or action of the client himself may be required, even though this is generally not the case;

purchase of articles: any transaction between a client and a store, at the check-out, the purchase of at least one article, and which ends in settlement (payment) by the client;

group of articles: any series of articles which is pre-defined in a permanent manner in the store (for example: each article; each sub-family of articles; each family of articles; each department of articles; all the articles in the store), or defined provisionally (all the articles of one purchase; all the articles of one supplier; all the articles which benefit from promotion and/or are included in an advertising leaflet etc.):

card: any card which contains information concerning the identity of a client presented during a payment; this can therefore involve cards used for payment (bank cards, credit cards etc.) or not (loyalty cards issued by the store etc.), and cards with automatic reading and acquisition (magnetic, electronic, optical etc.), or manual reading and acquisition; and receipt: a check-out receipt which is printed when the client goes to the check-out, and is designed to be given to the client, in particular as proof of purchase, listing the articles in a purchase and their price, as well as the amount of the purchase.

The invention thus relates to a device for automatic issuing of commercial advantage coupons when clients go to the check-out(s) of a store, in order to record and pay for articles purchased, comprising at least one computer system, known as the control server, to control at least one check-out, wherein it comprises in common for all the check-outs in the store:
at least one COUPON-TYPE file, for definition of the various types of coupons which can be issued by each check-out, in which there is recorded data which defines the characteristics common to the coupons, independently of their commercial advantage value, and/or conditions of allocation for issuing the coupons at the check-out;
at least one CRITERIA file, distinct from a COUPON-TYPE file, in which there are recorded, for each type of coupon in the TYPE file(s), records, each of which contains:
data relating to the conditions of allocation for issuing of each coupon of this type, and concerning articles purchased by a client when he goes to the check-out, and/or the identity of the client, and/or the date of purchase, and/or the time of purchase;
and/or data which makes it possible to determine the commercial advantage value of coupons of this type;
means for acquisition and/or updating in the store, for each control server, of the data recorded in the COUPON-TYPE and CRITERIA files;
and each control server is programmed to:
permit recording of the articles corresponding to a purchase, then payment of the corresponding amount by the client, and recording of this payment;
after recording of the payment, and for each type of coupon which can be issued by the corresponding check-out:
comparison of the data relating to articles purchased by the client and previously recorded, with the conditions of allocation articles purchased which are recorded in the CRITERIA file(s), then, if the conditions of allocation concerning the articles purchased are fulfilled, composition of the coupon on the basis of data in the COUPON-TYPE and CRITERIA files and of data recorded during purchase, concerning the articles purchased, and in particular determination of the corresponding commercial advantage value;
and/or comparison of the data relating to the identity of the client, which may be recorded during payment, with the conditions of allocation concerning the identity of the client, which are recorded in the CRITERIA file(s), then, if the conditions of allocation concerning the identity of the client are fulfilled, composition of the coupon on the basis of data in the COUPON-TYPE and CRITERIA files, and of the data recorded during the purchase concerning the identity of the client, and in particular determination of the corresponding commercial advantage value;
then issuing the coupon(s) allocated to the client.

Advantageously and according to the invention, at least one, and in particular only one file of the COUPON-TYPE is recorded in the mass memory of at least one control server.

Advantageously and according to the invention, at least one CRITERIA file is provided, known as the CRITERIA/RECEIPT file, which defines the conditions of allocation concerning articles purchased by the client. In addition, advantageously and according to the invention, at least one CRITERIA file is provided, known as the CRITERIA/CLIENT file, defining the conditions of allocation concerning the identity of the client(s).

Advantageously and according to the invention, at least one, and in particular only one CRITERIA/RECEIPT file is recorded in the mass memory of at least one control server. Similarly, advantageously and according to the invention, at least one, and in particular only one CRITERIA/CLIENT file is recorded in the mass memory of at least one control server.

The invention also relates to a store computerised cashing system, comprising at least one check-out for recording and payment of articles purchased, and at least one computer system, known as the control server, to control at least one check-out, wherein it comprises a device according to the invention.

The invention also relates to the method implemented by a device according to the invention. The invention thus relates to a method for automatic issuing of commercial advantage coupons, when clients go to the check-out(s) of a store, in order to record and pay for articles purchased, this store having at least one server computer system, known as the control server, to control at least one check-out, wherein, in the store, for each control server, and in common for all the check-outs of the store, there are recorded and updated:
in at least one COUPON-TYPE file for definition of the various types of coupons which can be issued by each check-out, data which defines the characteristics common to the coupons, independently of their commercial advantage value and the conditions of allocation for issuing the coupons at the check-out;
in at least one CRITERIA file, distinct from a COUPON-TYPE file, for each type of coupon in the COUPON-TYPE file(s), at least one record containing:
data relating to the conditions of allocation for issuing of each coupon of this type, and relating to articles purchased, and/or the identity of the client, and/or the date of purchase, and/or the time of purchase;
and/or data making it possible to determine the commercial advantage value of coupons of this type; and, since each control server is programmed to permit recording of articles corresponding to a purchase, then payment of a corresponding amount by the client, and recording of this payment, after recording of the payment, and for each type of coupon which can be issued by the corresponding check-out:
there is comparison of the data relating to articles purchased by the client and previously recorded, with the conditions of allocation concerning articles purchased and recorded in the CRITERIA file(s), then, if the conditions of allocation relating to the articles purchased are satisfactory, the coupon is composed on the basis of the data in the COUPON-TYPE and CRITERIA files, and of the data recorded during the purchase concerning the articles purchased, and in particular there is determination of the corresponding commercial advantage value;
and/or there is comparison of the data relating to the identity of the client, which is optionally recorded during the payment, with the conditions of allocation concerning the identity of the client and recorded in the CRITERIA file(s), then, if the conditions of allocation concerning the identity of the client are fulfilled, the coupon is composed on the basis of data in the COUPON-TYPE and CRITERIA files, and of the data recorded during the purchase concerning the identity of the client, and in particular there is determination of the corresponding commercial advantage value; and
then the coupon(s) allocated to the client are issued.

It should be noted that the device and the method according to the invention are fully integrated in a store cashing system, by additional programming in the software of the control servers which control the check-outs, and addition of simple specific files, without requiring modification of the pre-existing data, and in particular in the article files.

The invention also relates to a device and a method, characterised in association by all or some of the characteristics previously described, or described hereinafter.

BRIEF DESCRIPTION OF THE DRAWINGS

Other objects, characteristics and advantages of the invention will become apparent from reading the following description, with reference to the attached figures, in which.

The device according to the invention is incorporated in a computerised store cashing system of the conventional type, such as the EVOLUTEL cashing system made by the company Infomil (France).

In fact, the device according to the invention consists substantially of addition of data files, and appropriate programming of the computerised cashing system.

In addition, it should be noted that the invention applies to cashing systems other than the EVOLUTEL system.

DESCRIPTION OF THE PREFERRED EMBODIMENTS

Computerised cashing systems for stores comprise at least one computer system, known as the control server 1,2. Each control server 1,2 is connected to at least one check-out 3, of which it controls the functioning. In fact, from the point of view of computing functioning, a check-out 3 substantially consists of a logic card, which is seen as a peripheral terminal by the control server 1,2 to which it is connected. A check-out 3 thus consists in practice of a logic card which is connected to the control server 1,2 by a serial connection, for example RS 232, and a plurality of peripherals connected to this logic card, i.e.: a cashier interface (keyboard and display unit); a display unit which is destined for the client; an optical bar code reader device; means for processing of cheques (reader and printer); an electronic terminal for payment by means of bank cards, with a keyboard for acquisition of the confidential codes; and a check-out receipt printer etc.

Each check-out 3 thus transmits data to the associated control server, 1,2, and in particular data relating to the various articles purchased and the payment made, and receives data from the control server 1,2, and in particular the various data necessary for production of the receipt (price of the articles, date, sales tax, total amount etc.), and signals and data for payment of the purchases (acceptance of a method of payment, data printed on a cheque, or bank card receipt etc.)

Figure 1:
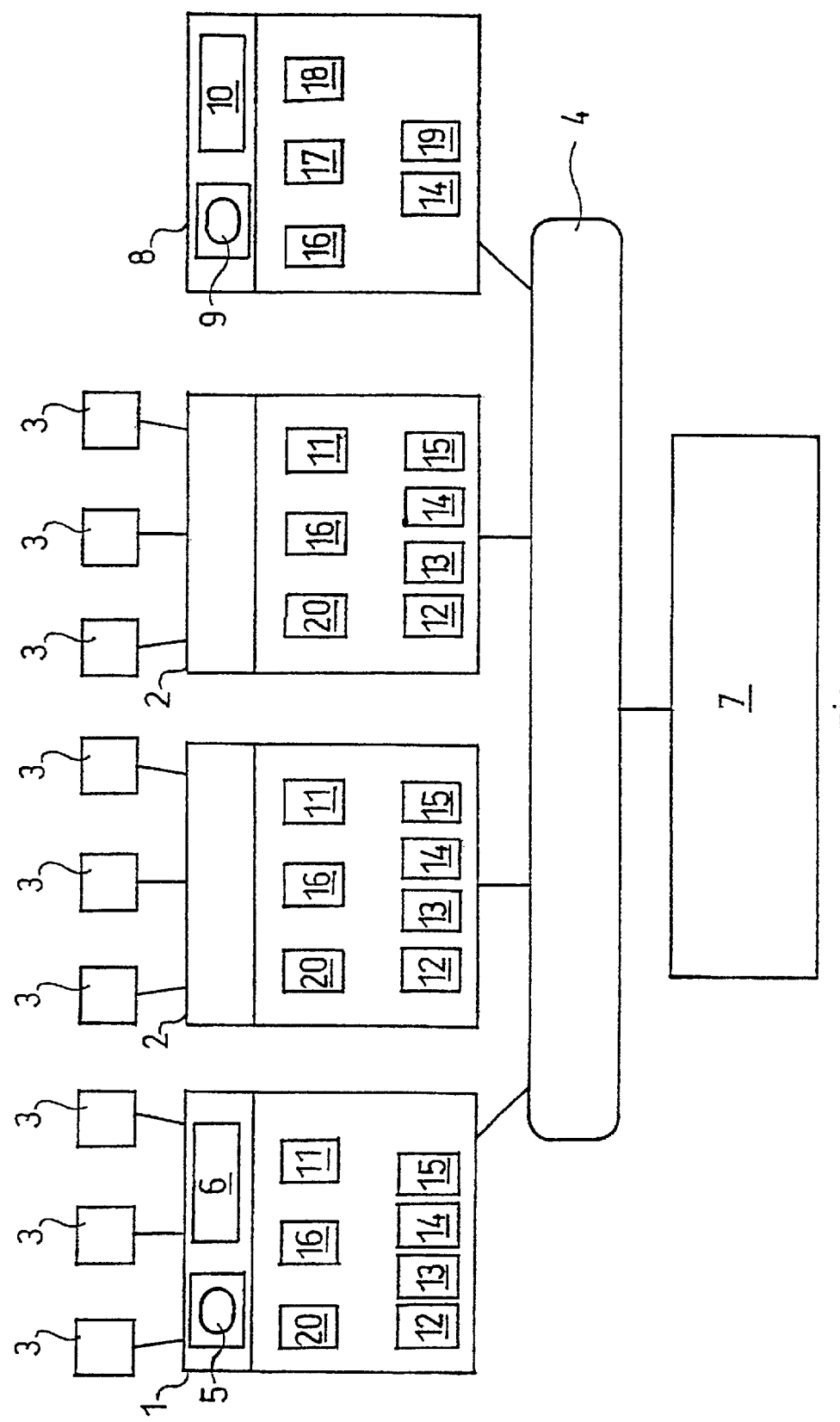
FIG. 1 is a general diagram of an embodiment of a computerised store cashing system according to the invention, comprising a device according to the invention.

A conventional cashing system can comprise a single control server, to which several check-outs 3 are connected in a loop or in a star, or, in the most common cases and preferably, a network of control servers which are connected to one another by a network bus 4. In the example shown in FIG. 1, the computerised cashing system comprises three control servers 1, 2, and, connected to each of them, three check-outs 3.

Each control server 1, 2 substantially consists of a conventional central micro-computer unit, comprising at least one micro-processor mother-board, read-write memories and read-only memories, a mass memory, and the various interface cards necessary for functioning of the unit and connection of the latter to the network 4 and to the various associated check-outs 3. The various control servers 1, 2 are similar, i.e. they are designed to carry out the same functions in relation to the check-outs 3, and to function on the common network 4. In particular, they are programmed in the same manner, i.e. the same programmes are loaded and activated on the various control servers 1, 2. Similarly, the various control servers 1, 2 share the same common data files, which can either be recorded on one of the control servers 1, 2 (and accessed by the various control servers 1, 2 via the network), or, preferably, they can be duplicated in the mass memories on each of the control servers 1, 2. Each control server 1, 2 can however also contain data and/or files which are specific to it, in particular concerning the operating statistics of each of the check-outs 3 which is associated with it.

Nevertheless, one 1 of the control servers 1, 2, generally known as the concentrator, is programmed to control the network as a whole, and in particular to duplicate the various information and data on the various control servers 1, 2 in an identical manner, and in real time. In addition, the concentrator control server 1 has a user interface in the form of a keyboard 5 and a screen 6, whereas in general the other control servers 2, which are controlled in a slave manner via the network 4 by the concentrator 1, do not have either a screen or a keyboard.

In addition, the network bus 4 is also connected in general to an accounting and commercial control computer system 7 of the store, which receives the data relating to the various sales made, which is supplied to it by the various control servers, 1, 2 and emits onto the network 4 accounting and commercial data obtained from the store, in particular an ARTICLE file 20, which is duplicated on each control server 1, 2, containing data relating to the various articles (code, prices etc.), data relating to discounts to be applied etc.

In addition, the computerised cashing system in general also comprises an additional server computer system 8, known as the CLIENT server 8, which is connected to the network bus 4 of the control servers 1, 2, and makes it possible to carry out specific control operations which do not concern directly the functioning of the check-out 3. No check-out 3 is connected to this CLIENT server 8. This CLIENT server 8 also consists of a micro-computer, with a keyboard 9 and a screen 10, and, for example, makes it possible to emit in real time, and to control the cards presented by the clients for payments, and to implement data selection programmes, in particular for selection of clients, which are designed for commercial or marketing operations.

The control software for the check-out 3, of each control server 1, 2, makes it possible in particular to create and update a LOG file 11, specific to each control server 1, 2, which inventories all the events which take place at the check-outs 3 which are associated with it, and in particular the data relating to the various check-out receipts printed (check-out receipt number, check-out number, cashier number, codes and prices of the articles purchased, date and time etc.)

The above-described general structure and functioning of a store cashing system are known, and all of the other detailed characteristics of a cashing system of this type, which are not previously described, are incorporated in the present description by reference, in particular the known characteristics of EVOLUTEL cashing systems made by the company Infomil (France).

In a cashing system of this type, the invention consists of attaching specific files, and adding specific program modules which make it possible to issue commercial advantage coupons automatically when clients go the check-outs 3 of the store, in order to record and pay for their purchases of articles.

The device according to the invention comprises in common for all the check-outs in the store:

- at least one COUPON-TYPE file 12, for definition of the various types of coupons which can be issued by each check-out 3, in which there is recorded data which defines the characteristics common to the coupons, independently of their commercial advantage value and/or of the conditions of allocation for issuing the coupons at the check-out;
- at least one CRITERIA file 13, 14, distinct from the COUPON-TYPE file(s), in which there is/are recorded, for each type of coupon in the TYPE file(s), at least one of the records, containing:
- data relating to the conditions of allocation applicable for issuing of each ticket of this type, and concerning articles purchased and/or the identity of the client, and/or the date of purchase, and/or the time of purchase, and/or the data which makes it possible to determine the commercial advantage value of coupons of this type;
- means 1, 4, 5, 6 for acquisition and/or updating in the store, for each control server, of the data recorded in the COUPON-TYPE 12 and. CRITERIA 13, 14 files;

and each control server 1, 2 is programmed to:

- permit recording of articles corresponding to a purchase, then payment of the corresponding amount by the client, and recording of this payment;
- after recording of the payment, and for each type of coupon which can be issued by the corresponding check-out 3:
- comparison of the data relating to articles purchased, with the conditions of allocation concerning articles purchased, which are recorded in the CRITERIA file(s) 13, 14, then, if the conditions of allocation concerning articles purchased are fulfilled, composition of the coupon on the basis of the data in the COUPON-TYPE 12 and CRITERIA 13, 14 files and of the data recorded during purchase, concerning the articles purchased, and in particular determination of the corresponding commercial advantage value;
- and/or comparison of the data relating to the identity of the client, which may be recorded during payment, with the conditions of allocation concerning the identity of the client, which are recorded in the CRITERIA file(s) 13, 14, then, if the conditions of allocation concerning the identity of the client are fulfilled, composition of the coupon on the basis of the data in the COUPON-TYPE 12 and CRITERIA 13, 14 files, and of the data recorded during the purchase concerning the identity of the client, and in particular determination of the corresponding commercial advantage value;
- then issuing the coupon(s) allocated to the client.

In the embodiment shown, and according to the invention, the device comprises a single COUPON-TYPE file 12, which is duplicated in the mass memories of the various control servers 1, 2, via the network 4, by the concentrator control server 1. The COUPON-TYPE file 12 comprises, for each type of coupon to be defined, a record which defines the data common to this type of coupon. The successive fields of each record of the COUPON-TYPE file 12 can for example be the following:

- number of the type of coupon;
- name of the type of coupon;
- indication of the fact that this type of coupon can be allocated to all the clients in the store; or only to clients who hold a store loyalty card; or only to clients who do not hold a store loyalty card;
- the method of printing coupons of this type, selected from amongst: printing by the check-out receipt printer, after the check-out receipt, without separation of the coupon and the check-out receipt; printing by the check-out receipt printer, after the check-out receipt, with separation of the coupon from the check-out receipt; printing by a printer other than the check-out receipt printer, but which is located near the corresponding check-out 3, and is preferably connected to this check-out 3;
- data text destined for the clients, concerning the corresponding commercial advantage, this text containing, if applicable (i.e. if the commercial advantage has a value), a symbol which represents the value of the commercial advantage (for example a $ sign);
- a field defining a list of check-outs 3, to which issuing of coupons of this type is authorised;
- a unit in which the commercial advantage value of the coupon is expressed, if applicable;
- indication of whether a bar code which represents the coupon is printed together with the coupon or not;
- indication of the fact that the coupon is active or inactive;
- a field which makes it possible to define the dates and times of validity of a coupon of this type issued;
- a field which makes it possible to define whether or not a coupon of this type can be used for payment during a subsequent purchase; and
- a field which makes it possible to define a group of articles which must be present or absent in a subsequent purchase of articles, in order to authorise use of a coupon of this type issued, as payment for this subsequent purchase.

The last three of the above-described fields are fields which are used during subsequent utilisation of the coupon by the client, if the coupon defines a postponed commercial advantage. On the contrary, the other record fields previously described comprise data relating to issuing of coupons of this type. It should be noted that amongst these fields, some contain data relating to conditions of allocation of coupons of this type (beneficiary clients, check-outs which can issue coupons of this type, active/inactive). However, this data is common to all the coupons of the same type, and the fields in the record of the COUPON-TYPE file 12 comprise specific data which is independent of the commercial advantage value, and of the conditions of allocation of the coupons (number and name of the type of coupon, type of printing, text which constitutes the coupon, coupon value unit, presence or absence of a bar code).

Each control server 1, 2 is programmed to determine, after purchase by a client at a check-out 3, the types of coupons which can be allocated to this check-out 3, then, if the conditions of allocation have been fulfilled, to compose and issue the coupon(s) allocated to the client. In addition, each control server 1, 2 is programmed to replace the said symbol ($) which represents the commercial advantage value, in the text of the COUPON-TYPE file 12 record, by the commercial advantage value calculated, before issuing a coupon of this type. This value is calculated by the control server 1, 2 according to data which makes it possible to determine the commercial advantage value of the coupon of this type, which is recorded in particular in the appropriate CRITERIA file 13, 14.

More particularly, in order to compose and issue a coupon allocated to the client, each control server 1, 2 is programmed to:

form, from data in the COUPON-TYPE 12 and CRITERIA 13, 14 files, data representing a text which incorporates the commercial advantage value of the coupon, if this exists;

have this data printed by printing means which are near the check-out 3 where the client is located, and are preferably connected to this check-out 3; and update a file 11 which inventories the coupons issued, and in particular the LOG file 11 of the corresponding control server 1, 2.

Advantageously and according to the invention, the device comprises at least one CRITERIA file, known as the CRITERIA/RECEIPT file 13, which defines conditions of allocation relating to articles purchased, and at least one CRITERIA file 14, known as the CRITERIA/CLIENT file, which defines conditions of allocation relating to the identity of the client(s).

According to the embodiment shown, preferably and according to the invention, the device comprises a single CRITERIA/RECEIPT file 13, which is duplicated in the mass memories of the various control servers 1, 2, and is controlled and updated via the network 4, by the concentrator control server 1. Similarly, preferably and according to the invention, as shown, the device comprises a single CRITERIA/CLIENT file 14 which is duplicated in the various control servers 1, 2. On the other hand, this CRITERIA/CLIENT file 14 is preferably controlled and updated in real time by the client server 8, which emits this CRITERIA/CLIENT file 14 in real time on the network bus 4, destined for various control servers 1, 2, either directly, or through the intermediary of the concentrator control server 1, which receives this CRITERIA/CLIENT file 14 from the client server 8, and transmits it to the other control servers 2.

Thus, and according to the invention, the COUPON-TYPE 12 and CRITERIA 13, 14 files constitute common files which are duplicated in each control server 1, 2 via the network 4 by the concentrator control server 1, and/or by the client server 8.

For each type of coupon, the CRITERIA/RECEIPT file 13 comprises one or more records which define conditions of allocation, and, if applicable, data in order to determine the corresponding commercial advantage value of the coupons of this type. The fields of each record in this file 13 are for example the following:

corresponding number of the type of coupon;

category of an article group which must be present or absent in the articles purchased by the client, in order to trigger allocation of coupons of this type (i.e. whether this involves an isolated article, a sub-family of articles, a family of articles, a department of articles, or all the articles in the store, etc.);

a field which identifies the said article group which must be present or absent in the articles purchased by the client, in order to trigger allocation of coupons of this type;

a number which identifies this record;

a code which identifies a method of calculation applicable in order to determine the conditions of allocation which must be fulfilled by the said article group in the purchase previously identified, and/or which make it possible to calculate the commercial advantage value of coupons of this type;

a series of data which can be acquired by the store, in order to configure the said method of calculation, and to define its parameters;

the dates and times of issue possible for coupons of this type; and the formula for calculation of the value of coupons of this type, for example as established by the said method of calculation.

Each record in the CRITERIA/RECEIPT file 13 defines in a unique manner, for each type of coupon, a criterion (identified by the record number), comprising the said method of calculation, the said data, and the said calculation formula.

In addition, each control server, 1, 2 also comprises a copy of a METHODS OF CALCULATION file 15, in which there are stored the various algorithms which make it possible to execute these methods of calculation applicable to the various criteria. This METHODS OF CALCULATION file 15 is controlled and updated by the concentrator control server 1, and duplicated via the network 4 in the various control servers 1, 2.

Hereinafter there are described various possible embodiments of methods of calculation which can be used, in each case together with a practical example and the formula for calculation of the commercial advantage value. In the following examples, [U] design ates the unit of the type of coupons defined in the corresponding record of the COUPON-TYPE file 12, [M] defines the currency used in the store, and ENT is the entire part function.

Method 1: "Allocation of z [U], if the amount of a group is between x and y [M]"

Example: "Allocation of 15 [U] if the receipt amount is more than 1000 [M]

Formula: =z [U]

Method 2: "Allocation of z [U] every y [M] in a group, if at least x [M] have been purchased in this group"

Example: "Every 50 [M] in the butchery department, allocation of 3 [U], starting from 100 [M] of purchase in the butchery department"

Formula: =z.ENT [amount of group/y] [U]

Method 3: "Allocation of z [U], every y articles in a group, if at least x articles have been purchased in this group"

Example: "For every bottle of wine purchased, allocation of 0.5 [M] as a purchasing voucher"

Formula: =z.ENT [number of articles in the group/y] [U]

Method 4: "Allocation of x % [U] of the total amount of this group, if at least y [M] has been purchased in this group"

Example: "Purchasing voucher of 10% in [M] for every purchase in micro-computing"

Formula: =x %. amount of the group [U]

Method 5: "Allocation of z [U], if between x and y articles have been purchased in this group"

Example: "Allocation of 50 [U] for a purchase of 5 to 10 articles in the fruit and vegetables department"
Formula: =z [U]

Method 6: "Allocation of z [U] if there is no purchase in a group with a receipt amount of between x and y [M]"
Example: "If there is no purchase in the department 01 with a receipt for at least 500 [M], allocation of 10 points valid in your store"
Formula: =z [U]

Method 7: "Allocation of z [U] if there is no purchase in a group with a receipt amount of between x and y articles"
Example: "If there is no purchase in the department 01 with a receipt for at least 50 articles, allocation of 10 points valid in your store"
Formula: =z [U]

It should be noted that it is possible to define as many methods of calculation as required, and for this purpose it is sufficient to increase the size of the METHODS OF CALCULATION file 15. During each modification by the user (the store) of a record in the CRITERIA/RECEIPT file 13, the concentrator control server 1 is programmed to read in the METHODS OF CALCULATION file 15 a field which defines the formula for calculation of the value, and to copy this field in the field of the corresponding record in the CRITERIA/RECEIPT file 13.

The client server 8 comprises a CARD file 16, containing data relating to the clients and to the cards presented by the clients during payments, at least one RECEIPT file 17, in which there is recorded the data relating to previous purchases by the clients, and means for calculation and generation of at least one CRITERIA/CLIENT file 14, comprising data which associates a type of coupon with a client to be identified. These means for calculation and generation consist of a programme or programmes which are known (in their own right) for selection of clients, and which, for example from data relating to identity of the clients, which is contained in the CARD file 16, and previous purchasing behaviour of the clients identified by the RECEIPT file 17, relating to card-holding clients, make it possible to produce a SELECTED CLIENTS file 18, comprising data which identifies clients to which specific commercial advantages can be allocated. On the basis of this SELECTED CLIENTS file 18, which for each client selected contains the identity of the client and the corresponding card number, the client server 8 is programmed to process the CRITERIA/CLIENT file 14 by combining the following fields in each record in this file:

a number for the type of coupon allocated;
the fields for identification of a client obtained from the SELECTED CLIENTS file 18;
the possible dates and times of issuing of coupons of this type for this client;
a number which identifies this record; and
the formula for calculation of the corresponding commercial advantage value.

Each record in this CRITERIA/CLIENT file 14 defines in a unique manner for each type of coupon and each client selected, a criterion (identified by the record number), comprising the said calculation formula.

This programming can be extremely simple, since the store itself acquires the number of the type of coupons and calculation formula, or a calculation formula number which makes it possible to locate this calculation formula in a separate file (for example the METHODS OF CALCULATION file 15). As a variant, it is also possible for each CRITERIA/CLIENT file 14 to comprise a field which defines a calculation method number applicable, in a manner similar to the CRITERIA/RECEIPT file 13. Thus, a coupon of this type can be allocated to this client only if the conditions of allocation on the receipt, defined by the said method of calculation in the file 15, have been fulfilled, and if this client presents his card during payment. Also, as a variant, it is possible to provide in the records in the CRITERIA/CLIENT file 14, an additional field making it possible to limit the number of occasions on which the corresponding criterion is used in order to issue a coupon of this type for each client.

An example of a record in the CRITERIA/CLIENT file 14 is therefore as follows: type 300/Mr Dupont—card number/July 1997/10 [U].

Thus, by means of this record, Mr DUPONT will be allocated a coupon of type 300, with a value equivalent to 10 units, each time he goes to the check-out of the store, during the month of July 1997.

Preferably, the CARD file 16 corresponds solely to the data relating to the store loyalty cards, i.e. to the clients who have chosen to subscribe to a store loyalty card. This CARD file 16 is addressed continuously in real time by the client server 8, to each of the control servers 1, 2, via the network 4, as in the case of the CRITERIA/CLIENT file 14.

On the other hand, the RECEIPT file 17 is established and/or updated every day after closure of the store, by the client server 8, on the basis of the various LOG files 11 of the various control servers 1, 2. The client server 8 scans these various LOG files 11, and records in the RECEIPT file 17 the data relating to the purchases during the day by the clients identified in the CARD file 16.

Whenever a commercial advantage coupon is issued by a control server 1, 2, corresponding data is recorded in the LOG file 11 of the control server 1, 2.

This data is as follows:
the number identifying the receipt corresponding to the articles purchased;
the check-out and cashier numbers;
the number of types of coupons;
the corresponding record data in the COUPON-TYPE file 12, with the exception of the field which contains the text;
the total value calculated for the coupon issued;
the date and time at which the coupon was issued; and
the number identifying the coupon.

Each day, after closure of the store, the client server 8 scans all of the LOG files 11, and establishes and/or updates a COUPON file 19, in which there is recorded the data relating to the various coupons issued by the various control servers 1, 2. In the COUPON file 19, the records have the following fields:

all of the fields previously described, relating to the coupon data recorded in the LOG file 11, but with the field of the coupon number placed at the head, and the field of the receipt number placed at the tail;
a field indicating the date of return of the coupon to the store; and
a field indicating the number of the receipt against which this coupon has been used, in particular for payment, when the coupon is returned.

Advantageously and according to the invention, each control server is programmed, for each type of coupon, to compare the data relating to articles purchased, on the conditions of allocation of the CRITERIA/RECEIPT file(s)

13, and then, for each type of coupon, to compare the data relating to the identity of the client, which is optionally recorded when payment is made, together with the data relating to the identity of the client(s) in the CRITERIA/CLIENT file(s) 14, then, when a coupon allocated according to the conditions of allocation of a CRITERIA/CLIENT file is of the same type as a coupon allocated according to the conditions of allocation of a CRITERIA/RECEIPT file 13, to add up the corresponding commercial advantage values, in order to calculate the total value of the coupon, before issuing it.

The invention also relates to the method implemented by means of the device according to the invention.

In particular, a method according to the invention advantageously comprises the following characteristics:

data relating to the conditions of allocation of types of coupons is recorded, comprising conditions of allocation concerning articles purchased, in at least one CRITERIA file, known as the CRITERIA/RECEIPT file 13, and data is recorded relating to the conditions of allocation concerning the identity of the client(s) in at least one CRITERIA file, known as the CRITERIA/CLIENT file 14;

there is connection by means of a common computer network 4, a plurality of control servers 1, 2, each of which is associated with at least one check-out 3, one 1 of the control servers being programmed to control and update via the network 4, data common to all the control servers 1, 2, in particular by duplicating this data in each control server 1, 2 via the network 4, this common data comprising COUPON-TYPE files 12 and CRITERIA files 13, 14, and at least one ARTICLE file 20, relating to the articles in the store;

on the basis of data recorded relating to the client and to the cards presented when payments are made by the clients, and data recorded relating to previous purchases made by the clients, there is calculation and generation of at least one CRITERIA/CLIENT file 14, comprising data which associates a type of coupon with a client identified;

there is recording of data relating to the clients and to the cards presented by the clients when payments are made, data relating to previous purchases made by the clients, and the CRITERIA/CLIENT file(s) 14 in a computer system, known as the CLIENT server 8, which is connected to the network 4 of control servers 1, 2;

each day, after closure of the store, there is establishment and/or updating of an RECEIPT file 17, in which the data is recorded relating to the purchases made during the day by the clients identified in a CARD file 16;

for each type of coupon there is comparison of the data relating to articles purchased in accordance with the conditions of allocation of the CRITERIA/RECEIPT file(s) 13, and then, for each type of coupon, there is comparison of the data relating to the identity of the client, which is optionally recorded when payment is made, together with the data relating to the identity of the client(s) in the CRITERIA/CLIENT file(s) 14, then, when a coupon allocated in accordance with the conditions of allocation of a CRITERIA/CLIENT file 14 is of the same type as a coupon allocated in accordance with the conditions of allocation of a CRITERIA/RECEIPT file 13, the corresponding commercial advantage values are added up, in order to calculate the total value of the coupon before it is issued;

since each of the check-outs 3 has a check-out receipt printer, in order to issue a coupon, printing takes place on a printer selected from amongst: the check-out receipt printer, the coupon being printed after the check-out receipt, without separation of the coupon and the check-out receipt; the check-out receipt printer, the coupon being printed after the check-out receipt, with separation of the coupon and the check-out receipt; a printer other than the check-out receipt printer, but which is located near the corresponding check-out 3, and is preferably connected to this check-out 3; and in order to compose and issue a coupon allocated to the client:

on the basis of data in the COUPON-TYPE 12 and CRITERIA 13, 14 files, data is constituted representing a text showing the commercial advantage value of the coupon;

this data is printed out by printing means located near to the check-out 3; and a LOG file 11 which inventories the coupons issued, is updated.

Figure 2:
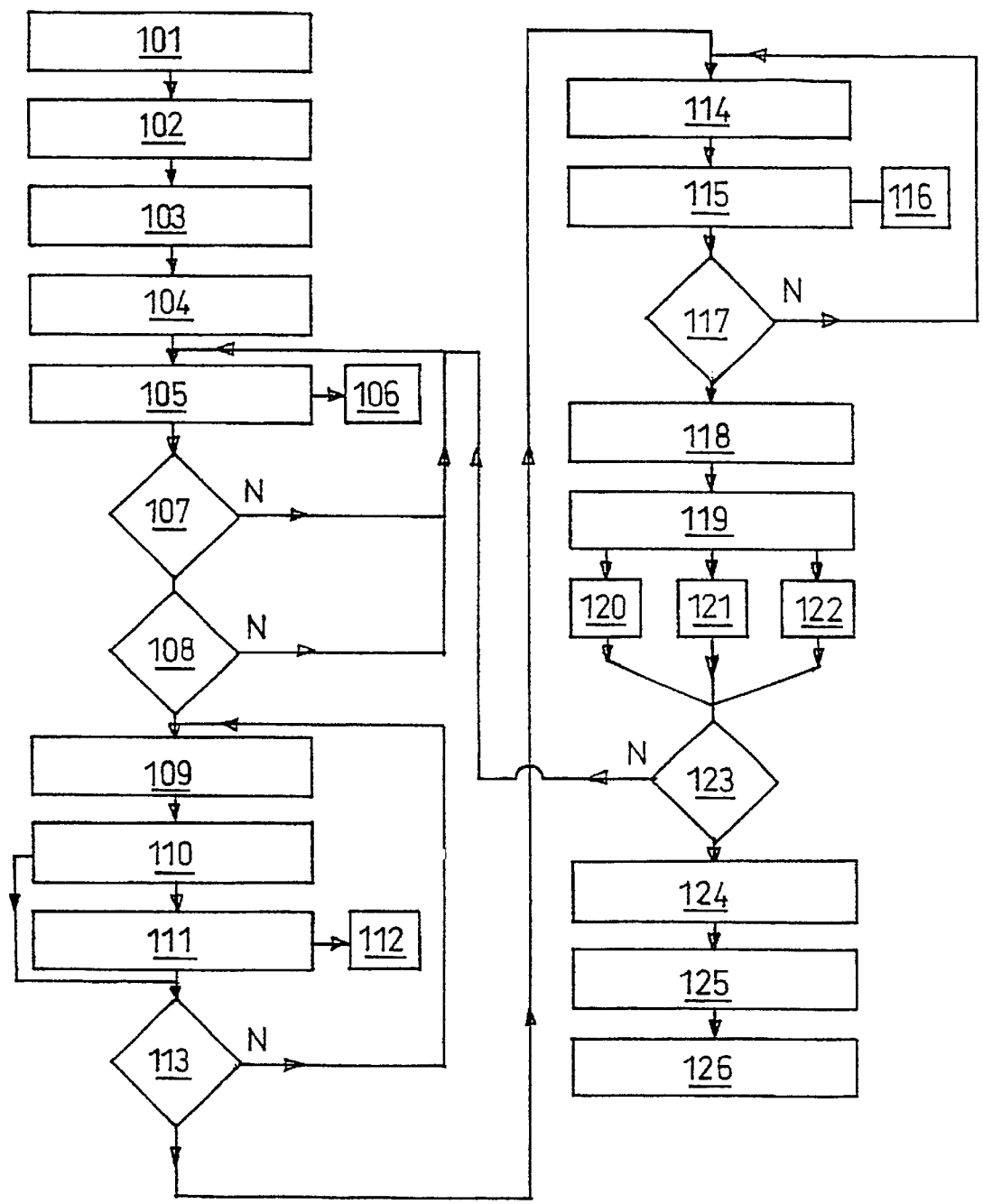
FIG. 2 is a schematic flow chart illustrating the main steps of an embodiment of a method according to the invention.

FIG. 2 shows an embodiment of a control method as a whole for a check-out 3, by a control server 1, 2, according to the invention.

When it is inactive, each check-out 3 is in a condition of waiting for the client, represented by the step 101. When a client goes to the check-out, all of the operations are carried out in a conventional manner for corresponding recording of the articles purchased and printing of the check-out receipt, which takes place subsequently, during step 102. Further to this recording of the various articles purchased, if the client presents a card, and in particular a loyalty and/or payment card, during step 103, there is storage of the fact that the client is a card-holder of the store. Then, during step 104, all the operations are carried out necessary for payment of the purchase, corresponding to the pre-printed check-out receipt. It should be noted that steps 101 to 104 are already commonly used and known, and thus do not need to be described in detail.

However, contrary to the methods according to the known art, after the payment, the method for checking at the check-out 3 is continued, in order to execute the method according to the invention. In step 105, there is access sequentially to the various records in the COUPON-TYPE file 12. Thus, there is access firstly to the first record in this file. Each time access to a record takes place during step 105, there is simultaneous execution of a step 106 for initialisation of a counter. After having accessed the record for a type of coupon, there is examination of the field which defines beneficiary clients (those who are card-holders and/or those who are not), which is compared in step 107 with the data previously stored (in step 103) concerning the client who has just made the purchase. If this type of coupon is not applicable to the client, there is a return to step 105, in order to access the subsequent record. If this type of coupon is applicable to the client, continuation takes place by examining in step 108, whether this type of coupon can be issued at the corresponding check-out 3, by comparing the check-out number with the field which defines the numbers of the check-outs at which this type of coupon can be issued. If this type of coupon is not applicable to this check-out 3, there is a return to step 105 for access to the subsequent record in the COUPON-TYPE file 12. If, on the other hand, this type of coupon is also applicable to the check-out 3 concerned, the method is continued.

During the subsequent step 109, there is access sequentially to the records in the CRITERIA/RECEIPT file 13, which have in their first field the number of the type of coupons corresponding to the type of coupons in the record accessed in step 105. Thus, there is access firstly to the first record present in the CRITERIA/RECEIPT file 13 for this type of coupon. During step 110, there is then comparison of the data relating to the articles purchased and recorded during step 102, in accordance with the conditions of allocation relating to the articles purchased, obtained from application of the method of calculation defined in the record in the CRITERIA/RECEIPT file 13 and from the data also acquired in this record.

For example, if the number for the method for calculation of the record in the CRITERIA/RECEIPT file 13 corresponds to the method 1 previously described, and in the above-described example, the fact is stored in the data field that x=1000 and y=999 999. In step 110, there is thus comparison of the total amount of the receipt, and examination of whether it exceeds 1000 [M], i.e. for example 1000 francs.

If these conditions of allocation are fulfilled, during step 111, there is determination of the corresponding commercial advantage value, by application of the calculation formula of the record in the CRITERIA/RECEIPT file 13. In many cases, this calculation formula is reduced simply to equation with a pre-determined value. In the above-described example, this value is 15. Then, in step 112, there is incrementation of the counter (initialised in step 106), by the value thus calculated. In step 113, there is examination of whether there is another subsequent record in the CRITERIA/RECEIPT file 13 for the same type of coupon. If this is the case, there is then return to step 109, in order to access this subsequent record. If this is not the case, the method is continued.

If the conditions of allocation are not fulfilled, there is transition directly from step 110 to step 113, in order to access a subsequent record in the CRITERIA/RECEIPT file 13, if applicable.

In the subsequent step 114, there is then access sequentially to the records in the CRITERIA/CLIENT file 14 for the type of coupon concerned. Thus, there is access firstly to the first record in the CRITERIA/CLIENT file 14, which comprises the same number for the type of coupons. Then, in step 115, it is examined whether the data recorded during the purchase, and in particular during payment and/or presentation of the card, concerning the identity of the client, correspond to the data stored in this CRITERIA/CLIENT file 14. If this is the case, there is application of the calculation formula for the commercial advantage value stored in the last field in this record, in order to determine this value. When this value has been determined, in step 116, the counter for the corresponding value is incremented, then the method is continued. Otherwise (this record does not correspond to the client), the method is continued directly.

It is then examined in step 117 whether there is another subsequent record in the CRITERIA/CLIENT file 14 for the same type of coupon. If this is the case, there is return to step 114, in order to access this subsequent record. Otherwise, there is continuation of the method by the step in 118, in which the coupon is composed, and is allocated a coupon number.

In order to compose the coupon, the symbol ($) which represents the commercial advantage value of the text stored in the record for the type of coupons, is replaced by the final value obtained from the counter (which has previously been incremented in steps 112 or 116). The whole of the text thus obtained is then extracted and recorded in the memory.

During the same step 118, there is also allocation of a number to the coupon to be issued. In addition, if the record for the type of coupon determines the presence of a bar code, in a known manner there is produced and associated with the coupon a bar code which is representative of this coupon, i.e. the number of the coupon.

There is then determination in step 119 of the printing method applicable to this coupon, by reading of the field corresponding to the record in the COUPON-TYPE file 12. According to the value present in this field, three cases are possible: either, during step 120, there is printing of the coupon on the check-out receipt, after the check-out receipt and without separation; or, in step 121 there is printing of the coupon on a printer other than the check-out receipt printer; or, in step 122, all of the data which constitutes the coupon is put into a queue for postponed printing from the check-out receipt printer. After one of the steps 120, 121 or 122 has been carried out as applicable, there is examination in step 123 of whether there is another record for another type of coupon in the COUPON-TYPE file 12. If this is the case, there is return to step 105, and all of the steps 105 to 123 are repeated, for this subsequent record in the COUPON-TYPE file 12. If this not the case, the method is continued.

In the subsequent step 124, there is writing in the LOG file 11 of the corresponding control server 1, 2, of all of the following data: the list of articles purchased, the various actions by the cashier during recording of the articles, and, for each coupon issued, all of the above-described data for recording of the coupon (receipt number, check-out and cashier number, data for recording of the corresponding COUPON-TYPE file 12, with the exception of the text, having calculated the total value, date and time, and number of the coupon).

The check-out receipt is then cut during step 125, and in step 126, there is printing of all of the coupons and other data present in the queue of the check-out receipt printer, and in particular of any coupons which were placed in the queue during step 122. The check-out 3 is then returned to the waiting condition in step 101.

As can be seen, the method according to the invention is fully integrated in the method for control of the check-outs 3, and all of these steps which make it possible to issue the coupons are executed by the control server 1, 2, which is associated with the corresponding check-out 3.

In addition, execution of the method according to the invention does not require any connection to a computer outside the shop. The same applies to the installation and/or the configuration of the device according to the invention and of the store cashing system, which can thus be totally autonomous.

Figure 3:
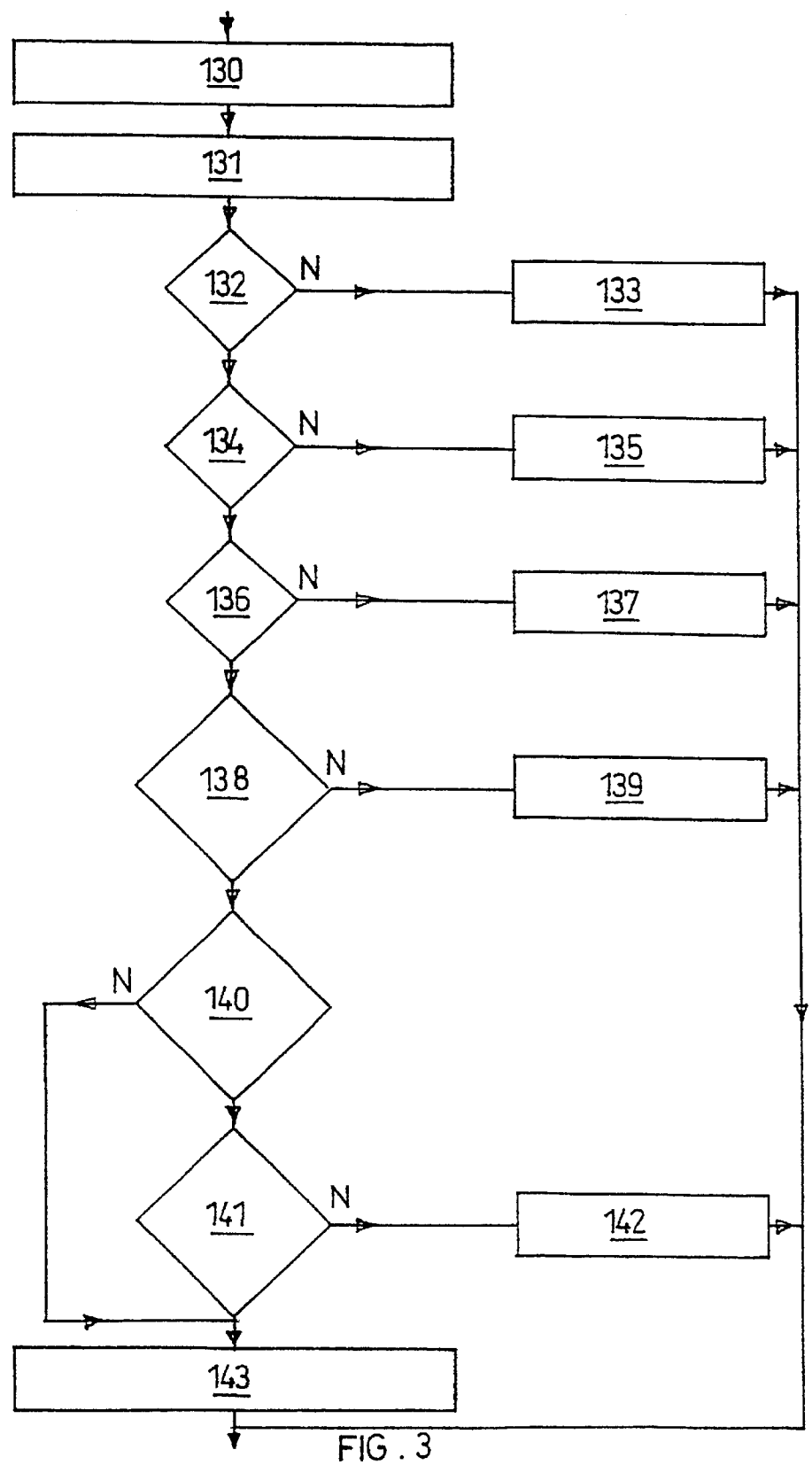
FIG. 3 is a schematic flow chart illustrating the main steps of an method implemented in order to take into account payment at least partially with a commercial advantage coupon of the type which can be used for payment, previously issued by a device according to the invention.

FIG. 3 represents the method implemented when a coupon previously issued is returned, for the purpose of use by a client, during a subsequent purchase, as a purchasing discount.

This method is thus implemented during a payment step subsequent to recording of the articles for a purchase, such as the payment step 104 shown in FIG. 2.

Upon presentation of a coupon by the client, during step 130, there is firstly acquisition of the corresponding coupon number, by optical reading (if the coupon is provided with a bar code) or manual reading, or by any other manner, according to the support used for this coupon.

In fact, it should be noted that although the method shown in FIG. 2 includes only coupons printed on paper, any other form of production of coupons is possible, and in particular by writing on magnetic-cards and/or on electronic chip cards, etc. Nevertheless, in all cases, a support which provides information to the client concerning the nature of the coupon issued must be provided to the client. The embodiment shown in FIG. 2 is the most advantageous and the most economical.

After acquisition of the coupon number, in step 131, there is access to the data recorded in the COUPON file 19 of the client server 8. In the embodiment in FIG. 1, this COUPON file 19 is provided only on the client server 8. In fact, access to this file is in general infrequent. However, if necessary, as a variant, the COUPON file 19 can also be duplicated on all the control servers 1, 2, via the network 4, in order to accelerate the processing times.

Then, during the subsequent step 132, there is examination of whether the coupon presented is present in the COUPON file 19. If this is not the case, payment is refused during step 134. Otherwise, subsequently, during step 133, there is examination of whether the coupon can be used for payment of a purchase, i.e. as a purchasing discount (the corresponding field in the COUPON-TYPE file 12 having been recorded in the LOG file 11, then in the COUPON file 19). If this coupon cannot correspond to a purchasing voucher, payment is refused in step 135. If, on the other hand, this coupon can be used as a purchasing voucher, the dates and times of validity of the voucher are then examined in step 136. If this data is not in conformity, payment is refused in step 137. If, on the other hand, the dates and times of validity are in conformity, in step 138 it is examined whether the value of the coupon is lower than or equal to the remaining amount owed for the payment to be made. If this is not the case, payment is refused in step 139. Otherwise, it is examined in step 140 whether a condition for presence of a group of articles in the receipt is necessary in order to authorise payment by means of this coupon. If this is the case, it is then examined in the following step 141 whether the articles purchased and previously recorded correspond to this condition. If this is not the case, payment is refused in step 142. On the other hand if this is the case, payment is accepted in step 143. If no condition of presence of an article group in the receipt is required in step 140, there is transition directly to step 143 for acceptance of the payment.

The invention can form the basis of many variants in comparison with the embodiment previously described and represented. In addition, persons skilled in the art will be able to carry out all of the above-described steps and functions on the basis of the description provided, and by means of simple programming techniques.

What is claimed is:

1. A device for automatically issuing commercial advantage coupons when clients go to a check-out of a store, in order to record and pay for articles purchased, comprising at least one computer system control server, to control at least one check-out, wherein the device comprises in common for each check-out in the store:

at least one COUPON-TYPE file, for definition of the various types of coupons which can be issued by each check-out, in which there is recorded at least one of data which defines the characteristics common to the coupons, independently of their commercial advantage value and the conditions of allocation for issuing the coupons at the check-out;

at least one CRITERIA file, distinct from the at least one COUPON-TYPE file, in which there are recorded, for each type of coupon in the at least one COUPON-TYPE file, records, each of which contains at least one of:

data relating to the conditions of allocation for issuing of each coupon of this type, and concerning at least one of the articles purchased, the identity of the client, the date of purchase and the time of purchase;

and data which makes it possible to determine the commercial advantage value of coupons of this type;

means for at least one of acquiring and updating in the store, for each control server, of the data recorded in the COUPON-TYPE and CRITERIA files;

and each control server is programmed to:

permit recording of the articles corresponding to a purchase, then payment of the corresponding amount by the client, and recording of this payment, after the payment has been recorded, and for each type of coupon which can be issued by the corresponding check-out at least one of:

comparison of the data relating to the articles purchased, with the conditions of allocation concerning the purchase made of articles, recorded in the at least one CRITERIA file, then, if the conditions of allocation concerning the articles purchased are fulfilled, composition of the coupon on the basis of data in the at least one COUPON-TYPE and the at least one CRITERIA files and of data recorded during purchase concerning the articles purchased, and in particular determination of the corresponding advantage value;

and comparison of the data relating to the identity of the client, which may be recorded during payment, with the conditions of allocation concerning the identity of the client, which are recorded in the at least one CRITERIA file, then, if the conditions of allocation concerning the identity of the client are fulfilled, composition of the coupon on the basis of data in the at least one COUPON-TYPE and the at least one CRITERIA files and of the data recorded during the purchase concerning the identity of the client; and then issuing the coupon allocated to the client.

2. The device as claimed in claim 1, wherein the at least one COUPON-TYPE file is recorded in a mass memory of at least one control server.

3. The device as claimed in claim 1, wherein the at least one CRITERIA file is a CRITERIA/RECEIPT file, that defines conditions of allocation concerning the articles purchased.

4. The device as claimed in claim 3, wherein the at least one CRITERIA/RECEIPT file is recorded in a mass memory of the at least one control server.

5. The device as claimed in claim 1, wherein the at least one CRITERIA file is a CRITERIA/CLIENT file, that defines conditions of allocation concerning the identity of the client.

6. The device as claimed in claim 5, wherein the at least one CRITERIA/CLIENT file is recorded in the mass memory of at least one control server.

7. The device as claimed in claim 1, comprising a plurality of control servers, each of which is associated with at least one check-out, and is connected by a common computer network, one of the control servers being programmed to control and update data common to all the control servers, via the network, this common data comprising COUPON-TYPE and CRITERIA files and at least one ARTICLE file relating to the articles in the store.

8. The device as claimed in claim 5, further comprising at least one CLIENT server, which is connected to the network of the control servers, and comprises a CARD file, which contains data relating to the clients and to the cards presented by the clients when payments are made, at least one RECEIPT card, in which there is recorded data relating to previous purchases made by the clients, and means for calculation and generation of at least one CRITERIA/

CLIENT file, comprising data associating a type of coupon with a client identified.

9. The device as claimed in claim 8, wherein the RECEIPT file is at least one of established and updated every day after closure of the store, and contains data relating to purchases made during the day by clients identified in the CARD file.

10. The device as claimed in claim 3, wherein the CRITERIA/RECEIPT file comprises, for each type of coupon, a field that defines a method of calculation applicable in order to determine at least one of the conditions of allocation and the commercial advantage value of coupons of this type, and that comprises a METHODS OF CALCULATION file, in which various methods of calculation applicable are stored.

11. The device as claimed in claim 3, wherein each control server is programmed, for each type of coupon, to compare the data relating to articles purchased, with the conditions of allocation of the at least one CRITERIA/RECEIPT file, and then, for each type of coupon, to compare the data relating to the identity of the client, which can be recorded during payment, with the data relating to the identity of the client in the at least one CRITERIA/CLIENT file, then, when a coupon allocated in accordance with the conditions of allocation of a CRITERIA/CLIENT file is of the same type as a coupon allocated according to the conditions of allocation of a CRITERIA/RECEIPT file, addition of the corresponding commercial advantage values, in order to calculate the total value of the coupon before it is issued.

12. The device as claimed in claim 3, wherein, for each type of coupon, the CRITERIA/RECEIPT file comprises a field that defines a group of articles which must be present or absent in the articles purchased by the client, in order to trigger allocation of coupons of this type.

13. The device as claimed in claim 1, comprising a single COUPON-TYPE file, comprising, for each type of coupon, a field which defines a list of check-outs, at which issuing of coupons of this type is authorised, and in that each control server is programmed, after a purchase is made by a client at a check-out, to determine the types of coupons which can be allocated at this check-out, then, if the conditions of allocation are fulfilled, to compose and issue the coupon allocated to the client.

14. The device as claimed in claim 1, wherein for each type of coupon, the COUPON-TYPE file comprises a data text destined for the client concerning the corresponding commercial advantage, together with, in the data text, a symbol which represents the commercial advantage value, and each control server is programmed to replace the symbol by a corresponding commercial advantage value calculated, before a coupon of this type is issued.

15. The device as claimed in claim 1, wherein, for each type of coupon, the COUPON-TYPE file comprises a field which defines a unit of value, in which the commercial advantage value is expressed.

16. The device as claimed in claim 1, wherein, since each of the check-outs is provided with a check-out receipt printer, for each type of coupon the COUPON-TYPE file comprises a field which defines a method for printing coupons of this type, selected from amongst: printing by the check-out receipt printer, after the check-out receipt, without separation of the coupon from the check-out receipt; printing by the check-out receipt printer, after the check-out receipt, with separation of the coupon and the check-out receipt; and printing by means of a printer other than the check-out receipt printer, which is located near the corresponding check-out.

17. A device as claimed in claim 1, wherein for each type of coupon, the COUPON-TYPE file (12) comprises a field indicating whether the coupons of this type can be issued to all the clients or to only some of them.

18. A device as claimed in claim 1, wherein for each type of coupon, the COUPON-TYPE file (12) comprises a field which indicates whether or not a bar code must be printed simultaneously with the coupons of this type.

19. A device as claimed in claim 1, wherein, in order to compose and issue a coupon allocated to the client, each control server (1, 2) is programmed to:
    form from data in the COUPON-TYPE (12) and CRITERIA (13, 14) files, data representing a text with the commercial advantage value of the coupon;
    have this data printed by printing means which are located near to the check-out (3); and
    update a file (11) which inventories the coupons issued.

20. A store computerised cashing system, comprising at least one check-out for recording and payment of articles purchased, and at least one computer system control server to control at least one check-out, wherein the cashing system comprises a device as claimed in claim 1.

21. A method for automatic issuing of commercial advantage coupons when clients go to the check-out of a store, in order to record and pay for articles purchased, this store having at least one server computer system, known as the control server to control at least one check-out, wherein there are recorded and updated in the store, for each control server, and in common for all the check-outs in the store:
    in at least one COUPON-TYPE file for definition of the various types of coupons which can be issued by each check-out, data defining the characteristics common to the coupons, independently of their commercial advantage value, and conditions of allocation for issuing the coupons at the check-out;
    in at least one CRITERIA file, distinct from the at least one COUPON-TYPE file, for each type of coupon in the at least one COUPON-TYPE file, at least one record containing at least one of:
    data relating to the conditions of allocation for issuing of each coupon of this type, and concerning articles purchased, the identity of the client, the date of purchase, and the time of purchase;
    and data which makes it possible to determine the commercial advantage value of coupons of this type; and, each control server being programmed to permit recording of articles corresponding to a purchase, then payment of the corresponding amount by the client, and recording of this payment, and, after recording of the payment, and for each type of coupon which can be issued by the corresponding check-out:
    there is at least one of comparison of the data relating to articles purchased, with the conditions of allocations concerning articles purchased, which are recorded in the at least one CRITERIA file, then, if the conditions of allocation concerning the articles purchased are fulfilled, composition of the coupon on the basis of data in the at least one COUPON-TYPE and at least one CRITERIA files, and of the data recorded during the purchase concerning the articles purchased;
    and comparison of the data relating to the identity of the client, which may be recorded during payment, with the conditions of allocation concerning the identity of the client, which are recorded in the at least one CRITERIA file, then, if the conditions of allocation concerning the identity of the client are fulfilled, composition of the coupon on the basis of information in the at least one COUPON-TYPE and at least one CRITERIA files, and of the data recorded during the purchase concerning the identity of the client, and in particular, determination of the corresponding commercial advantage value; and then issuing the coupon allocated to the client.

22. A method as claimed in claim 21, wherein at least one COUPON-TYPE file (12) is recorded in the mass memory of at least one control server (1, 2).

23. A method as claimed in claim 21, wherein data relating to conditions of allocation concerning articles purchased by the client, is recorded in at least one CRITERIA file, known as the CRITERIA/COUPON file (13).

24. A method as claimed in claim 23, wherein at least one CRITERIA/COUPON file (13) is recorded in the mass memory of at least one control server (1, 2).

25. A method as claimed in claim 21, wherein data relating to conditions of allocation concerning the identity of the client(s) is recorded in at least one CRITERIA file, known as the CRITERIA/CLIENT file (14).

26. A method as claimed in claim 25, wherein at least one CRITERIA/CLIENT file (14) is recorded in the mass memory of at least one control server (1, 2).

27. A method as claimed in claim 21, wherein a plurality of control servers (1, 2), each associated with at least one check-out (3), is connected by means of a common computer network (4), one (1) of the control servers being programmed to control and update via the network (4) data which is common to all the control servers (1, 2), in particular by duplicating this data on each control server (1, 2) via the network, this common data comprising COUPON-TYPE (12) and CRITERIA (13, 14) files, and at least one ARTICLE file (20) relating to articles in the store.

28. A method as claimed in claim 25, wherein, on the basis of data recorded relating to the clients and the cards presented during payments by the client, and data recorded concerning previous purchases by the clients, at least one CRITERIA/CLIENT file (14) is calculated and generated, comprising data associating a type of coupon with a client identified.

29. A method as claimed in claim 25, wherein the data relating to the clients and the cards presented by the clients during payments, the data relating to previous purchases by the clients, and the CRITERIA/CLIENT file(s) (14) are recorded in a computer system known as the CLIENT server (8), which is connected to the network (4) of the control servers (1, 2).

30. A method as claimed in claim 21, wherein, each day, after closure of the store, a RECEIPT file (17) is established and/or updated, in which the data relating to purchases made during the day, by clients identified in a CARD file (16), is recorded.

31. A method as claimed in claim 23 wherein for each type of coupon, there is comparison of the data relating to articles purchased, in accordance with the conditions of allocation of the CRITERIA/RECEIPT file(s) (13), and then, for each type of coupon, there is comparison of the data relating to the identity of the client, which may be recorded during the payment, with the data relating to the identity of the client(s) in the CRITERIA/CLIENT file(s) (14), then, when a coupon allocated in accordance with the conditions of allocation of a CRITERIA/CLIENT file (14) is of the same type as a coupon allocated according to the conditions of allocation of a CRITERIA/RECEIPT file (13), the corresponding commercial advantage values are added up, in order to calculate the total value of the coupon before it is issued.

32. A method as claimed in claim 21, wherein, since each of the check-outs (3) is provided with a check-out receipt printer, in order to issue a coupon, there is printing on a printer selected from amongst: the check-out receipt printer, the coupon being printed after the check-out receipt, without separation of the coupon and the check-out receipt; the check-out receipt printer, the coupon being printed after the check-out receipt, with separation of the coupon and the check-out receipt; and a printer other than the check-out receipt printer, but which is located near the corresponding check-out (3).

33. A method as claimed in claim 21, wherein, in order to compose and issue a coupon allocated to the client:
  on the basis of data in the COUPON-TYPE (12) and CRITERIA (13, 14) files, data is constituted which represents a text with the commercial advantage value of the coupon;
  this data is printed by printing means located near to the check-out (3); and
  a file which inventories the coupons issued is updated.

34. A device for automatically issuing commercial advantage coupons when clients go to a check-out of a store, in order to record and pay for articles purchased, comprising at least one computer system control server, to control at least one check-out,
wherein the device comprises in common for each check-out in the store:
  at least one COUPON-TYPE file, for definition of the various types of coupons which can be issued by each check-out, in which there is recorded at least one of data which defines the characteristics common to the coupons, independently of their commercial advantage value and the conditions of allocation for issuing the coupons at the check-out;
  at least one CRITERIA file, distinct from the at least one COUPON-TYPE file, in which there are recorded, for each type of coupon in the at least one COUPON-TYPE file, records, each of which contains:
  at least one of data relating to the conditions of allocation for issuing of each coupon of this type, and concerning at least one of the articles purchased, the identity of the client, the date of purchase and the time of purchase;
  and data which makes it possible to determine the commercial advantage value of coupons of this type;
  means for at least one of acquiring and updating by the store, for each control server, of the data recorded in the COUPON-TYPE and CRITERIA files;
and each control server is programmed to:
  permit recording of the articles corresponding to a purchase, then payment of the corresponding amount by the client, and recording of this payment,
  after the payment has been recorded, and for each type of coupon which can be issued by the corresponding check-out at least one of:
  comparison of the data relating to the articles purchased, with the conditions of allocation concerning the purchase made of articles, recorded in the at least one CRITERIA file, then, if the conditions of allocation concerning the articles purchased are fulfilled, composition of the coupon on the basis of data in the at least one COUPON-TYPE and the at least one CRITERIA files and of data recorded during purchase concerning the articles purchased, and in particular determination of the corresponding advantage value;
  and comparison of the data relating to the identity of the client, which may be recorded during payment, with the conditions of allocation concerning the identity of the client, which are recorded in the at least one CRITERIA file, then, if the conditions of allocation concerning the identity of the client are fulfilled, composition of the coupon on the basis of data in the at least one COUPON-TYPE and the at least one CRITERIA files and of the data recorded during the purchase concerning the identity of the client; and then issuing the coupon allocated to the client.

35. A method for automatic issuing of commercial advantage coupons when clients go to the check-out of a store, in order to record and pay for articles purchased, this store having at least one server computer system, known as the control server to control at least one check-out, wherein there are recorded and updated by the store, for each control server, and in common for all the check-outs in the store:

in at least one COUPON-TYPE file for definition of the various types of coupons which can be issued by each check-out, data defining the characteristics common to the coupons, independently of their commercial advantage value, and conditions of allocation for issuing the coupons at the check-out;

in at least one CRITERIA file, distinct from the at least one COUPON-TYPE file, for each type of coupon in the at least one COUPON-TYPE file, at least one record containing:

at least one of data relating to the conditions of allocation for issuing of each coupon of this type, and concerning articles purchased, the identity of the client, the date of purchase, and the time of purchase;

and data which makes it possible to determine the commercial advantage value of coupons of this type; and, each control server being programmed to permit recording of articles corresponding to a purchase, then payment of the corresponding amount by the client, and recording of this payment, and, after recording of the payment, and for each type of coupon which can be issued by the corresponding check-out:

there is at least one of comparison of the data relating to articles purchased, with the conditions of allocations concerning articles purchased, which are recorded in the at least one CRITERIA file, then, if the conditions of allocation concerning the articles purchased are fulfilled, composition of the coupon on the basis of data in the at least one COUPON-TYPE and at least one CRITERIA files, and of the data recorded during the purchase concerning the articles purchased;

and comparison of the data relating to the identity of the client, which may be recorded during payment, with the conditions of allocation concerning the identity of the client, which are recorded in the at least one CRITERIA file, then, if the conditions of allocation concerning the identity of the client are fulfilled, composition of the coupon on the basis of information in the at least one COUPON-TYPE and at least one CRITERIA files, and of the data recorded during the purchase concerning the identity of the client, and in particular, determination of the corresponding commercial advantage value; and then issuing the coupon allocated to the client.

\* \* \* \* \*